(12) United States Patent
Lang et al.

(10) Patent No.: US 9,009,194 B2
(45) Date of Patent: Apr. 14, 2015

(54) REAL TIME AND DYNAMIC VOTING

(75) Inventors: Richard Lang, Sebastopol, CA (US); Kyle Faulkner, Orinda, CA (US)

(73) Assignee: Democrasoft, Inc., Santa Rosa, CA (US)

( * ) Notice: Subject to any disclaimer, the term of this patent is extended or adjusted under 35 U.S.C. 154(b) by 160 days.

(21) Appl. No.: 13/309,553

(22) Filed: Dec. 1, 2011

(65) Prior Publication Data

US 2012/0143914 A1 Jun. 7, 2012

Related U.S. Application Data (60) Provisional application No. 61/418,794, filed on Dec. 1, 2010.

(51) Int. Cl.
*G06F 17/30* (2006.01)

(52) U.S. Cl.
CPC .............................. *G06F 17/30696* (2013.01)

(58) Field of Classification Search
CPC ................... G06F 17/30684; G06F 17/30693; G06F 17/30657
USPC .................................................. 707/779, 748
See application file for complete search history.

(56) References Cited

U.S. PATENT DOCUMENTS

| | | | | |
|---|---|---|---|---|
| 5,875,432 | A * | 2/1999 | Sehr | 705/12 |
| 6,175,833 | B1 * | 1/2001 | West et al. | 707/661 |
| 7,975,920 | B2 * | 7/2011 | Chung et al. | 235/386 |
| 8,046,413 | B2 * | 10/2011 | Howell et al. | 709/205 |
| 8,442,424 | B2 * | 5/2013 | Socolof | 455/2.01 |
| 8,566,144 | B2 * | 10/2013 | Round et al. | 705/7.38 |
| 2002/0103696 | A1 * | 8/2002 | Huang et al. | 705/12 |
| 2003/0094489 | A1 * | 5/2003 | Wald | 235/386 |
| 2004/0158486 | A1 * | 8/2004 | Nudd et al. | 705/8 |
| 2005/0197885 | A1 * | 9/2005 | Tam et al. | 705/10 |
| 2006/0218009 | A1 * | 9/2006 | Grace et al. | 705/2 |
| 2007/0027730 | A1 * | 2/2007 | McArdle | 705/7 |
| 2008/0059308 | A1 * | 3/2008 | Gerken | 705/14 |
| 2008/0103877 | A1 * | 5/2008 | Gerken | 705/10 |
| 2008/0313026 | A1 * | 12/2008 | Rose et al. | 705/12 |
| 2008/0320159 | A1 * | 12/2008 | Naimark et al. | 709/231 |
| 2009/0020606 | A1 * | 1/2009 | Chung et al. | 235/386 |
| 2009/0106092 | A1 * | 4/2009 | Bowers | 705/12 |
| 2009/0239205 | A1 * | 9/2009 | Morgia et al. | 434/362 |
| 2009/0254934 | A1 * | 10/2009 | Grammens | 725/14 |
| 2010/0042460 | A1 * | 2/2010 | Kane, Jr. | 705/9 |
| 2010/0070501 | A1 * | 3/2010 | Walsh et al. | 707/736 |
| 2010/0153378 | A1 * | 6/2010 | Sardesai | 707/723 |
| 2011/0010367 | A1 * | 1/2011 | Jockish et al. | 707/733 |
| 2011/0089236 | A1 * | 4/2011 | Chung et al. | 235/386 |

(Continued)

*Primary Examiner* — Thanh-Ha Dang (74) *Attorney, Agent, or Firm* — Lewis Roca Rothgerber LLP (57) ABSTRACT

Embodiments of the present invention facilitate the solicitation of user input while allowing for dynamic changes to that input while concurrently ranking the same. Ranking occurs in real-time and allows for a user to alter their contribution or vote until the close of a contribution period allowing real-time influences to be taken into account. Contributions may be provided in response to or as a part of a template driven nomination process. Solicitations of input may occur in the context of a pre-defined slate of options for voting, nominating certain options for a subsequent or concurrent voting process, or choosing/suggest more than one option such as the best of a slate of options or the individual ranking of a slate of options. Embodiments of the present invention capture all user nominations or suggestions while simultaneously providing the real-time ranking and dynamic re-ranking of those nominations or suggestions.

15 Claims, 7 Drawing Sheets

(56) References Cited

U.S. PATENT DOCUMENTS

| | | | |
|---|---|---|---|
| 2011/0114724 A1* | 5/2011 | Lee | 235/386 |
| 2011/0145150 A1* | 6/2011 | Onischuk | 705/50 |
| 2011/0264665 A1* | 10/2011 | Mital et al. | 707/741 |
| 2012/0072275 A1* | 3/2012 | Grace et al. | 705/14.17 |
| 2013/0132985 A1* | 5/2013 | Howcroft et al. | 725/13 |

* cited by examiner

REAL TIME AND DYNAMIC VOTING

CROSS-REFERENCE TO RELATED APPLICATIONS

The present application claims the priority benefit of U.S. provisional application No. 61/418,794 entitled "Template Driven Nomination and Real Time Dynamic Voting," filed Dec. 1, 2010, the disclosure of which is incorporated herein by reference.

BACKGROUND OF THE INVENTION

1. Field of the Invention

The present invention generally concerns online polling and voting. The present invention more specifically concerns the solicitation of input and contributions from an online community, real-time ranking the input and contributions, and ongoing consideration of dynamic changes to the community input and contributions while concurrently ranking the same.

2. Description of the Related Art

Client and cloud based voting and polling applications currently exist in the art. These applications are typically used by groups of individuals whose input is being solicited by a person or organization. The organizations soliciting input can ask questions and end-users can vote on or respond to those questions. These questions are typically framed such that they solicit or require a simple yes/no or fixed multiple-choice vote.

Figure 1:
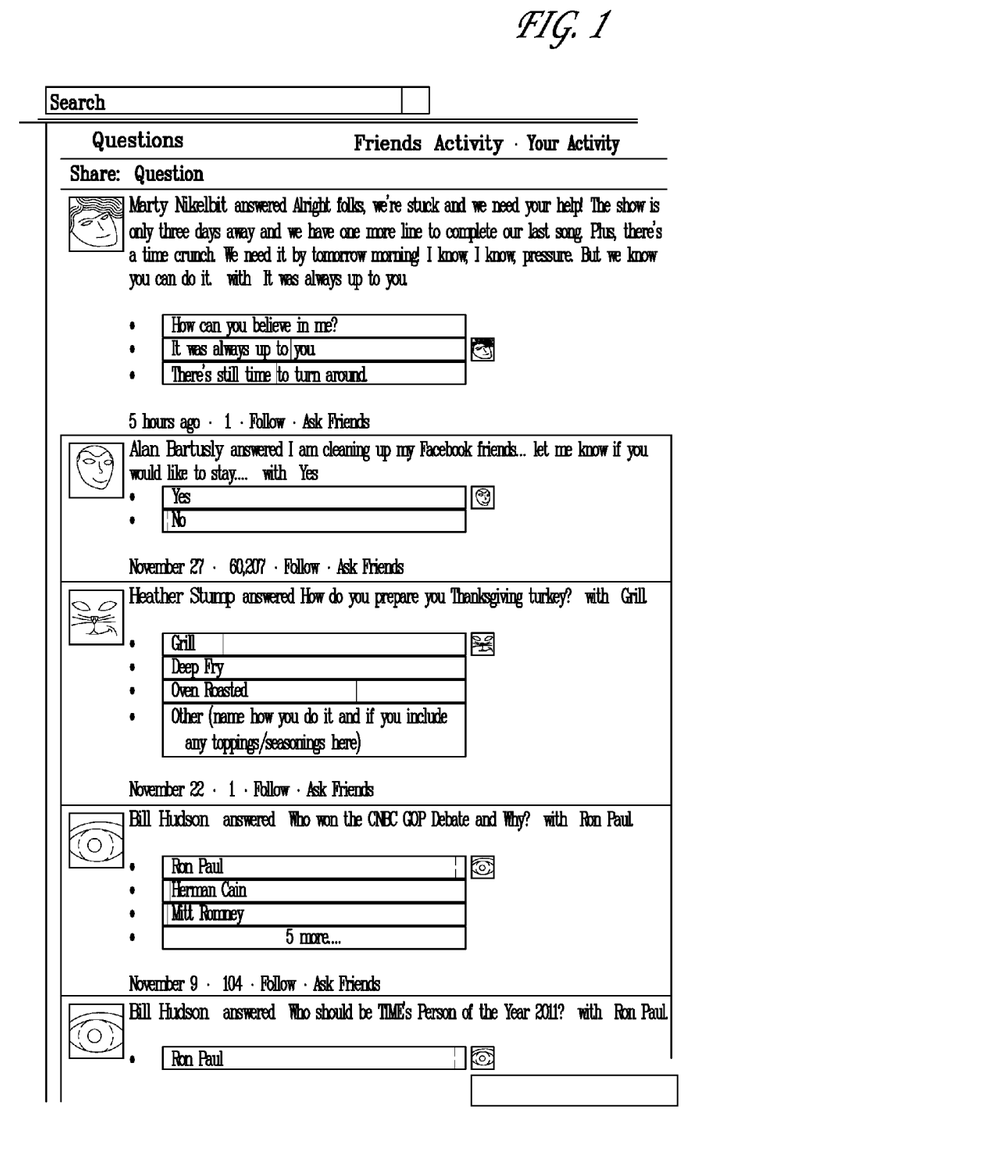
FIG. 1 illustrates a poll as found in the prior art.

The social networking site Facebook offers a polling/question application. An organization seeking input or feedback from users in the Facebook community implements the application in the Facebook environment by filling out a short HTML based poll/question creation form to generate the poll or query as illustrated in FIG. 1. The poll creation form generates the specific query (the question being asked of polled individuals) and the possible response options (yes, no, etc). Users are then able to select from amongst those options.

Other polling applications attempt to prioritize or rank user responses and submissions that have been solicited based on open ended questions. SurveyMonkey offers a variety of browser based polling services. These services allow for the generation of survey questions that trigger a response based on fixed responses, ratings, images, comments and essay boxes.

While SurveyMonkey allows for more 'free flow' based answers in the context of commentary or textual responses, a poll or survey creator must create a validation scheme that includes information related to a specified format for the response entry. When the criteria are not met, the respondent receives an error message, which may discourage the respondent from further participation in the poll or survey. Ranking of free form answers is difficult due to the presence of any number of variables. Not all of these variables may be present when a user proffers a vote or response meaning that not all responses may be equally or properly weighted.

A common drawback of these and other known polling applications is that once a user participates, the user is typically prevented from taking part in any further interaction by way of a cookie deposited on the computing device of the user or tracking data associated with a user profile. 'One and done' voting systems prevent a user from offering their opinion should it change after their initial vote is cast or opinion is proffered. Alternatively, a user may be allowed unlimited participation in a polling event. Such unlimited participation is, however, incorrectly characterized as that of a new participant. As a result, one user may vote 100 times and erroneously be considered the single vote of 100 separate participants. Such unlimited participation may skew poll results, especially if a particular user has an agenda with respect to the outcome of the poll (e.g., voting for a favorite player in the All-Star Game) and also incorrectly reflects the overall interest of a specific community in the question being asked.

In light of the foregoing, there is a need in the art for the solicitation of dynamic user input and the concurrent ranking of the same.

SUMMARY OF THE CLAIMED INVENTION

A first claimed embodiment of the present invention is for a method for processing user input. Through the claimed method, a query is published to a user audience. A first response to the query is received from users in the audience. Each of the audience members is an individually identifiable user. The query responses are then displayed in real-time. Updated responses are then received from one or more of the users that previously provided a first response. The updated responses are responsive to the initial published query. Updated query responses are displayed in conjunction with initial query responses, both being displayed in real-time.

A second claimed embodiment of the present invention is for a further method for processing user input. Through the second claimed embodiment, a query is published to a user audience. A response to the query is received from a first individually identifiable member of the audience. The response includes information prompted by a template corresponding to the query. The received response is then displayed as a potential response for consideration and selection by the remaining members of the user audience as a response to the published query.

DETAILED DESCRIPTION

Embodiments of the present invention concern the solicitation of input from a community and then ranking contributions received from the community. Ranking occurs in real-time and takes into account ongoing changes to community contributions. A user may alter their contribution or vote until the close of a contribution period. By allowing a community member to change their vote until the close of a contribution period, a more accurate ranking of contributions may be taken into account as those contributions reflect real-time influences.

Contributions may be provided in response to or as a part of a template driven nomination process. Prior art systems—like that illustrated in FIG. 1—simply request a limited set of information or single element of information such as a yes/no response, the name of a nominee, a favorite football team, or a suggested restaurant for lunch. Embodiments of the present invention, however, allow a party soliciting information to use a template to generate a query and subsequently request multiple elements of information from a community. The response from community members, which is template driven, requires a user to provide those multiple elements of information, which allows for more intelligent decision making responsive to the contributed information.

The template driving the voting or polling process may be fixed and include a pre-defined number of fields. The template may also evolve in response to the entry of certain fields of information whereby requests for additional nomination information may be spawned as a result of a prior provisioning of information. Templates may also be created by an author of the query whereby data query fields are inserted into the template from a preset menu of corresponding query elements that might otherwise be germane to the field of inquiry. Data fields may also be customizable based on the particular needs of an author.

Embodiments of the invention may be implemented in different contexts where input is being solicited from a community. For example, solicitations may be limited to a pre-defined slate of options where the community 'votes' on that static slate of options. The solicitation of input may—as an alternative or in addition to voting—include nominating certain options for a subsequent or concurrent voting process. Voting and nomination may also involve implementations where the community is allowed to choose (i.e., vote for) or suggest more than one option. The ability to choose or vote for more than one option may involve an equal weighting of any particular community member's votes (e.g., the best three choices of five available choices) or cascaded weighting of those votes (e.g., first, second, and third choice) whereby one vote is more meaningful than another. An individual nomination or suggestion too, may be independently attributed to separate suggestions or nominations submitted jointly as part of multiple nominations or suggestions that are part of a singular query or request.

Figure 2:
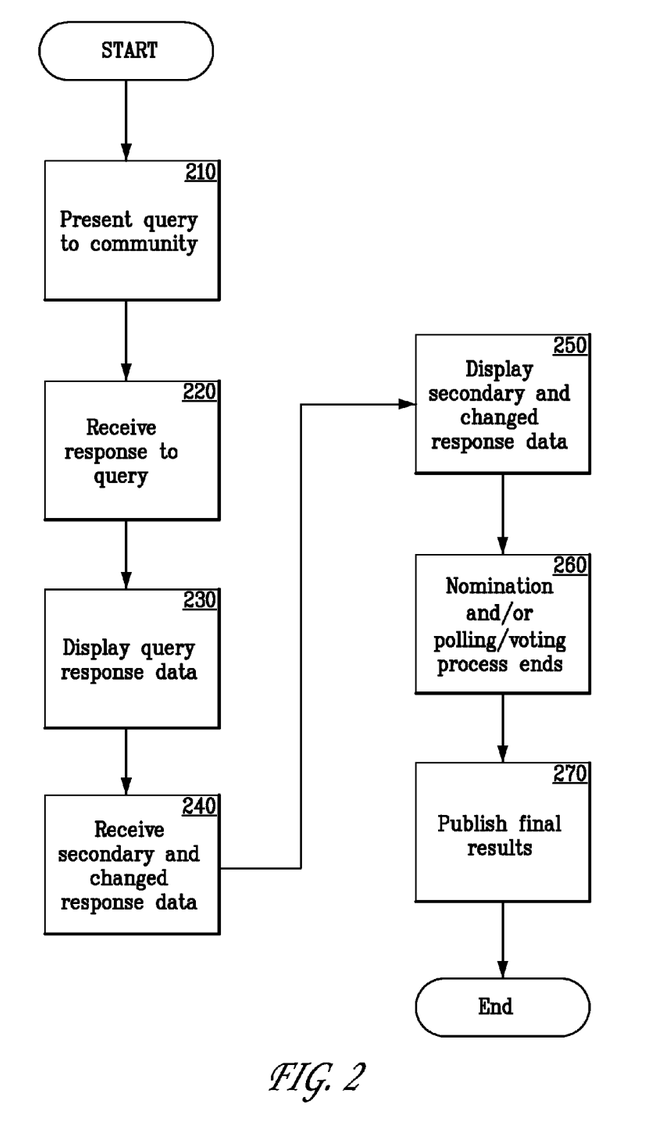
FIG. 2 illustrates a method for processing user input.

FIG. 2 illustrates a method 200 for processing user input. The method may be implemented through the use of instructions embodied in a non-transitory computer readable storage medium such as magnetic or optical disk drive. These instructions may be retrieved from the storage medium and executed by a computing device or processor as described in the context of FIG. 7 below.

In step 210, a query is presented to a community of users through a publication mechanism. This query may be published and displayed to members of the community by way of a user interface, such as a web browser or a native interface, generated, displayed, and executable on the likes of a desktop or laptop computer or mobile device. A community may be made aware of the query through an 'alert' such as a text message, electronic mail message, video based notification or a combination of the aforementioned. Queries may also be tracked as part of an RSS feed. Queries may also be accessible through a mobile device and corresponding application on that device (e.g., an 'app').

Information used to populate, for example, the web browser-displayed interface and which may include data related to the query, may be received over a communications network from the entity soliciting user input. This information may be delivered by a server (or series of servers) operated by an application service provider (ASP). The ASP may be tasked with hosting and serving the query as well as receiving data related to any subsequent responses. The ASP may also display data to the community pertaining to those responses (e.g., tallied results).

Data related to making the query may be received at the ASP from an individual user or entity soliciting the information. The ASP may also host dashboard-type applications that allow the entity or individual making the query to review granular response data that is of little or no interest to the community being queried. For example, information may be generated and displayed concerning when a query was posted, who viewed the query and when, when a user responded or contributed to the query, when a new contribution or idea is posted, if and when a user has changed a vote, or if and when a user has commented on a particular issue or idea. Such metric information allows for determinations as to user interest, activity, and end-results. Time-based changing of rankings may be displayed as well (e.g., when an option was ranked first, second, or third).

While presentation of the query in step 210 and other functionalities are described in the context of an ASP environment, embodiments of the present invention are not limited to such a specific implementation. Embodiments of the present invention may also be implemented in the context of client-host operations that may require dedicated software at both ends of a transaction. Queries may similarly be presented in a peer-to-peer type environment, which may require specific software implementation amongst participant peers. The aforementioned mobile device 'application' implementation may offer more limited functionality that is appropriate in the context of a mobile environment.

Following publication of a query to a community of users, those users may provide a response to the query, which is received at step 220. In prior art voting systems, a single user may create the appearance of hundreds of votes to single-handedly manipulate the outcome of the polling. Embodiments of the present invention may thus require each member of the community to register or create an account related to the query or an entity proffering the query and soliciting input. While a user may be able to change their vote as described herein, registration and identification of individual users will allow the system to determine whether a vote or nomination is new or merely updated. Means of tracking a user other than logging into a user account may be implemented including monitoring IP addresses, generating and depositing cookies, frequency of login, and network address translation.

The account may also be used to track actual user responses to maintain a history of votes and nominations. The information concerning voting and nomination history may be accessible to the entity publishing the query or other third-parties to allow for analytical analysis, which may be of value to entities such as advertisers. The user may be able to implement privacy provisions that prevent access to certain information by certain entities.

The possible responses to the query may be pre-defined whereby a user response is limited to a finite number of possibilities. While possible responses are limited, the responses are uniform. Potential responses may also be free-form whereby a user provides a user-specific and user-tailored response to the published query. These responses may be more varied and representative of popular sentiments versus a pre-defined list of responses, but inconsistent with respect to presentation. Parsing software may be utilized to derive context and meaning from a free-form response such that it may be distilled into a more consistent series of responses amongst all users. Responses may also be template driven, which are discussed in greater detail in the context of FIG. 5 below.

Upon receipt of query response data in step 220, the ASP server or other computing device processing the response data may allow for the display of query response data at step 230; in a preferred embodiment, this display occurs in real-time notwithstanding the fact that, in some instances, results may not be displayed until after the close of the contribution period or some other time frame in order to maintain the secrecy of voting results (e.g., in an election). This data, like the initial query, may be displayed through a web browser interface or other interface, which may be executable on a laptop or desktop computing device or through an 'app' on the likes of a mobile device.

Figure 3A:
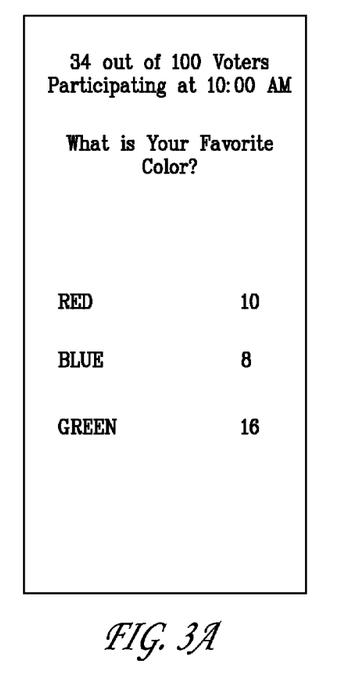
FIGS. 3A-3C illustrate the real-time display of query response data.
Figure 3B:
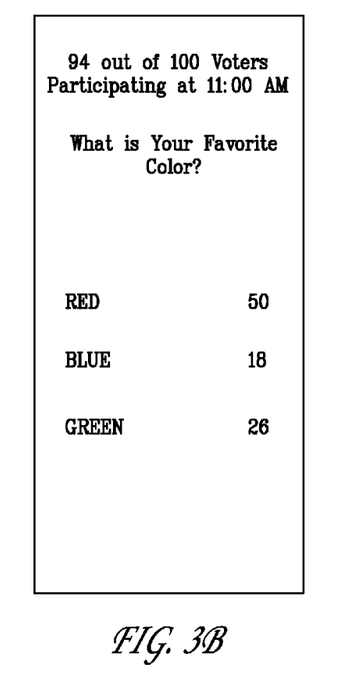
Figure 3C:
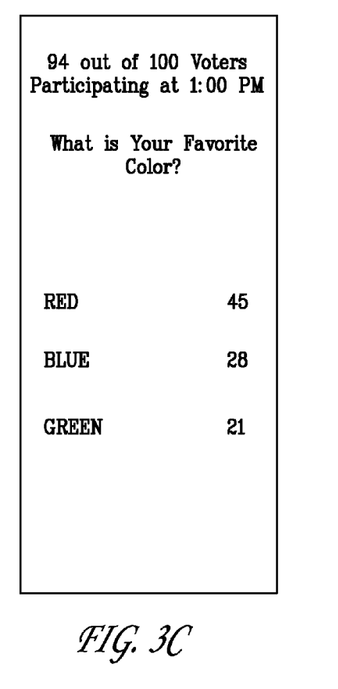

FIGS. 3A-3C illustrate the real-time display of query response data as described in the context of step 230. FIG. 3A illustrates the results of an initial set of responses to a query and that correspond to 34 initial responses (out of a possible 100 community members). FIG. 3B illustrates the results of responses to that query later in time, with an additional 60 community members having responded. FIG. 3C reflects the results of those same 94 community members having responded (6 members not having offered a response) a short time later, but wherein 10 of the community members have changed their vote after considering additional information that was not available at the time of voting. This information may include, but is not limited to, comments and arguments in favor of different or newly published alternatives that were not previously published at the time of the initial vote from the community member.

The change in response data from FIG. 3B to FIG. 3C is a result of the receipt of a second and updated response from community members in step 240 and that pertains to the initially published query. Prior art systems typically only allow for one vote and then for the voting period to end; while a user might view the results of voting as they are processed, the user is not allowed to change that vote. In embodiments of the present invention, however, a user may change their previous vote right up until the voting period closes. Similar changes may be made in the context of nominations. These changes may be unlimited or subject to a restriction on the number of times a vote may be changed.

The benefits of the ability to change a vote up until the end of a voting period are most evident in the context of public elections for governmental officials, especially those on the national level. For example, many registered voters in public elections now participate by absentee ballot. In order to ensure that their ballot is received and counted, many absentee voters will complete their ballot and submit the same well before the mandated deadline. Once the absentee ballot is mailed, however, the voter cannot change their vote should new information come to light that might influence their opinion on certain candidates or issues.

A common occurrence in national American politics, however, is the so-called "October Surprise," which is a news event that has the potential to influence the outcome of an election and that typically occurs late in the month of October and prior to Election Day on the first Tuesday in November. A voter that decides to vote in person may take information derived from such an event in their voting decision. An absentee voter, however, is likely to have already submitted their ballot and risks having voted for a candidate or issue that late breaking information would otherwise have cause them to change their vote. Through embodiments of the present invention, a voter may 'vote early,' but then change their vote prior to the end of the voting period of their opinion should change in the interim. These principles may be applied to national, state, or municipal elections for any number of positions and without regard to persons, places, or ideas.

FIGS. 3A and 3B thus represent the accumulation of initial response data from the community of users in step 220 and displayed at step 230. FIG. 3C, however, reflects the receipt of secondary and changed response data at step 240, which is then displayed in real-time at step 250. FIG. 3C also reflects the data corresponding to the remaining users that provided a response, but that have not otherwise changed their response since their initial response.

Upon expiration of a pre-determined response period, the nomination and/or polling/voting process ends at step 260. The expiration period may be set by the individual or entity that is seeking user input through publishing the query. Upon expiration of the response period at step 260, final results may be further published and made available to the community of users and/or the entity soliciting input at step 270. This final publication of results is in addition to the availability of real-time results that are updated as votes and contributions are received.

Figure 4:
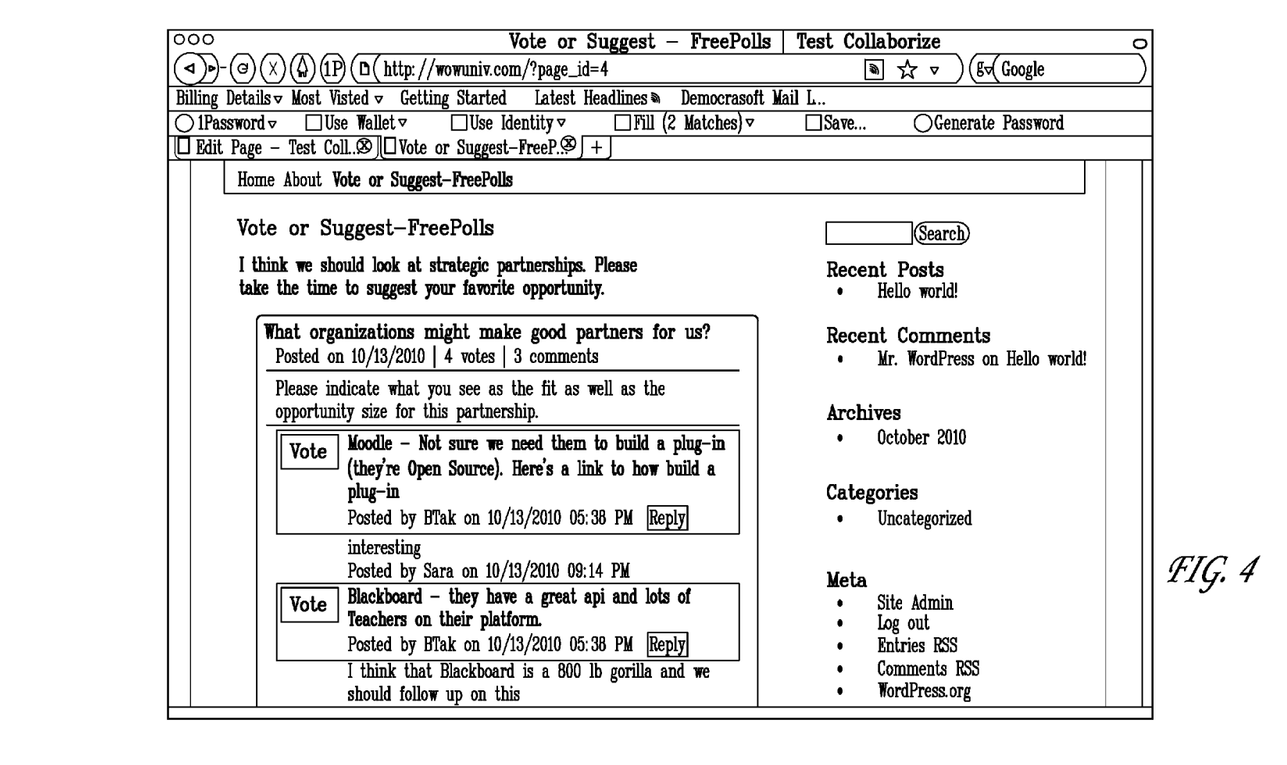
FIG. 4 illustrates commentary provided by a community of users during a voting process.

The aforementioned methodology may also integrate the acceptance and display of user comments and feedback. FIG. 4 illustrates commentary provided by a community of users during a voting process. In some embodiments of the present invention, one or more users from the community of users may be allowed to provide thoughts, comments, or other feedback related to their response to a published query. This commentary may be provided at the same time as an actual decision, vote, suggestion, or nomination is rendered by a voter at step 220 or step 240. A user may provide a comment concerning why they made a certain selection, advocating that others make a particular selection, or discouraging others to make a certain selection. Voters that have not yet made a selection, but that are viewing real-time results may take this information into account when ultimately making their selection. A user may alternatively provide comments or feedback after having made their vote or provide feedback that is responsive to the comments of another voter or participant.

In order to maintain the civility of a discussion board, comments may be subject to moderation. In such a system, an automated filter may search for certain prohibited terms or phrases and automatically prevent posting of comments including the same. A human moderator may also observe postings to check for contextual meaning and appropriateness of the forum. Comments may be subjected to moderation prior to or after posting. In the latter instance, comments may be subjected to moderation only if another user complains about a particular comment or remark. In some instances, a user may be required to log in prior to posting a remark to avoid anonymous postings although comments may be posted without the need for public knowledge of the speaker. A community member may, in some instances, be required to actually vote, nominate, or make some affirmative suggestion prior to providing feedback or commenting on the feedback of others.

The aforementioned cut-off time for voting may likewise apply to comments and feedback. Users may, however, directly and discreetly communicate with one another through a private messaging system rather than in the public forum during and after a voting process. The state of a user may also be recognized and information about that user may be presented. For example, if a particular community has ten members, whether or not a member has voted or offered some contribution in response to a query may be displayed to the rest of the community (e.g., voted, not voted; active; not active; anonymous vote; and actual vote). In this way, a user may be reminded or encouraged to contribute, which further richens the body of ideas, offers, and contributions.

As evidenced in the context of FIG. 4, the real-time voting and ranking of ideas may be furthered by the presentation of better and more complete ideas and contributions. For example, a particular idea—in a vacuum—may not immediately make sense to a community, which in turn may not vote favorably or otherwise support for the idea. If the community has a better understanding of why an idea was submitted, however, then they might be more willing to offer their support for that idea in the form of a vote and/or supportive comments. In this regard, a user may nominate an idea and provide information as to why that particular nomination is worthwhile. In order to derive relevant nomination information that is common to all nominations, such a nomination may be template driven. This template can be customized by the person who is making the query.

Figure 5:
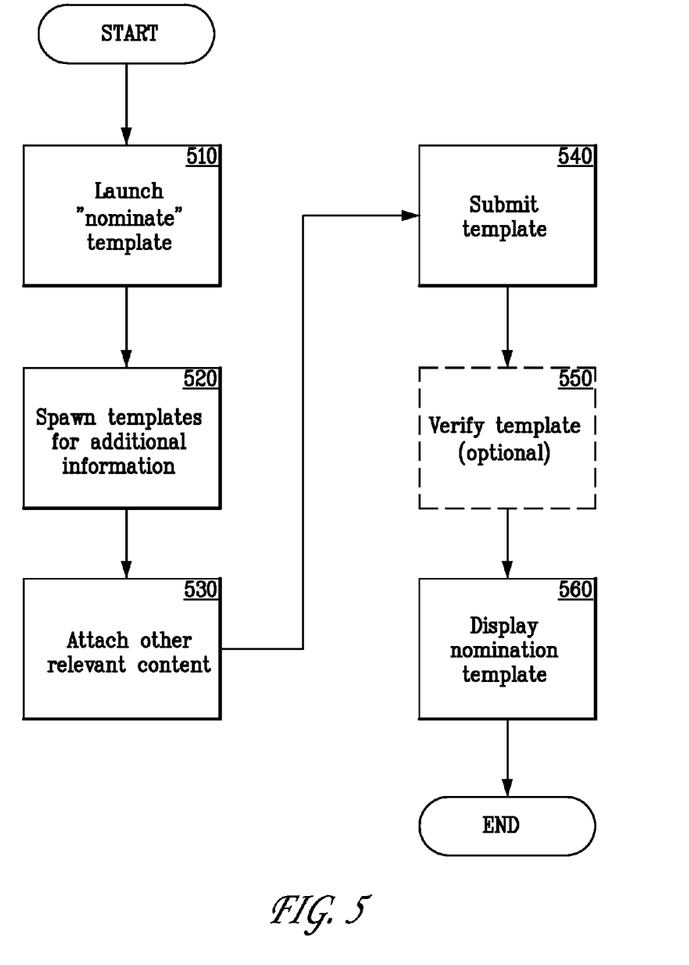
FIG. 5 illustrates a method for template based nominations.

FIG. 5 illustrates a method 500 for template-based nominations. Through the use of template-based nominations, a voter may make a more informed decision and do so in a template-based format that standardizes the look and presentation of the relevant data. The needs and criteria of the specific nomination process can be properly captured, either by pre-configured data entry fields or through the use of a template which allows the owner of a particular Vote or Nominate query to select appropriate criteria fields from an existing palate or list of choices, or to simply enter-in customized information that results in the creation of a customized nomination template with data fields that have been created by the owner of the question or query.

In step 510 of the method 500 illustrated in FIG. 5, a pre-configured "nominate" template is launched. This template contains structured data fields that pertain to the subject of the nominations. For example, a nomination "type" could be a "Person," "Place," or "Thing." In a 'person'-type nomination, the data fields might include information related to the name of the nominee, age, location, professional background, education, associations, and so forth.

In step 520, templates for additional nomination information are spawned in response to a prior provisioning of information. Entry of certain information in an initial template for a 'person'-type nomination may launch template fields for additional information. For example, upon completing a field for 'graduate education' information, a field for 'undergraduate' information may be generated; following completion of 'undergraduate' information fields, 'secondary school' information may be requested. The additional templates may be logic driven or follow a set script until the logic flow or script is completed.

Following completion of all templates in steps 510 and 520, the person submitting the nomination may attach other types of content relevant to the nomination in step 530. The information may include, but is not limited to, document files such as .txt, .doc, or .pdf and rich media files including video, audio, or images. Hyperlinks to third-party depositories of information may also be referenced (e.g., a reference to a YouTube, Web page, or news story).

Figure 6:
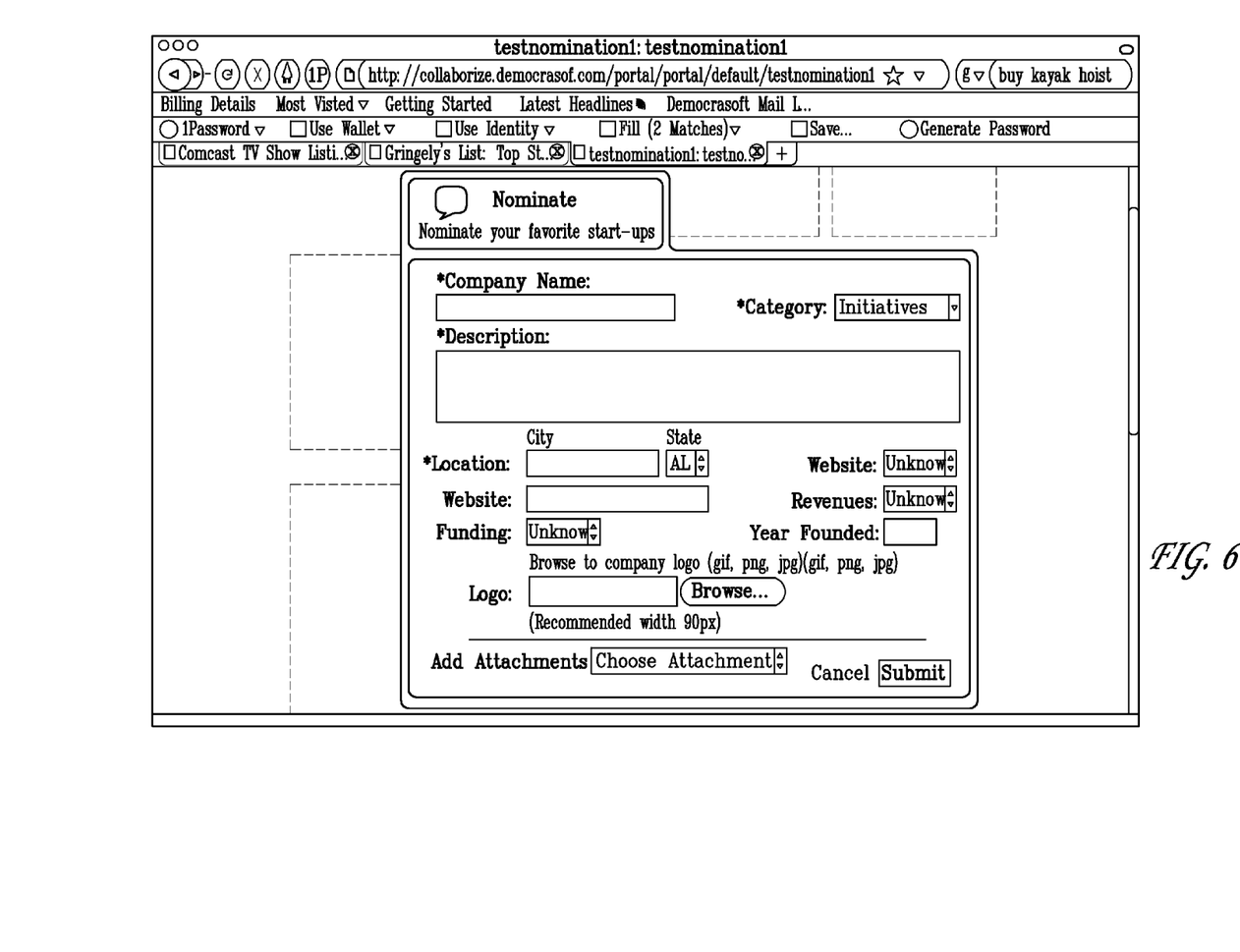
FIG. 6 illustrates a template as may be used in the method of FIG. 5.

Once the nomination templates of steps 510 and 520 have been completed and any additional information provided in step 530, the user may submit the template in step 540 by clicking a "submit" button. An optional verification operation may take place in step 550 to ensure that all templates have been completed or that any 'required' templates have had the requisite information provided. If all of the necessary templates have been properly completed, the information contained in the nomination template will then be displayed in a standardized format next to the 'voting' option for the nominee in step 560. FIG. 6 illustrates a template 600 as may be used in the method of FIG. 5.

Figure 7:
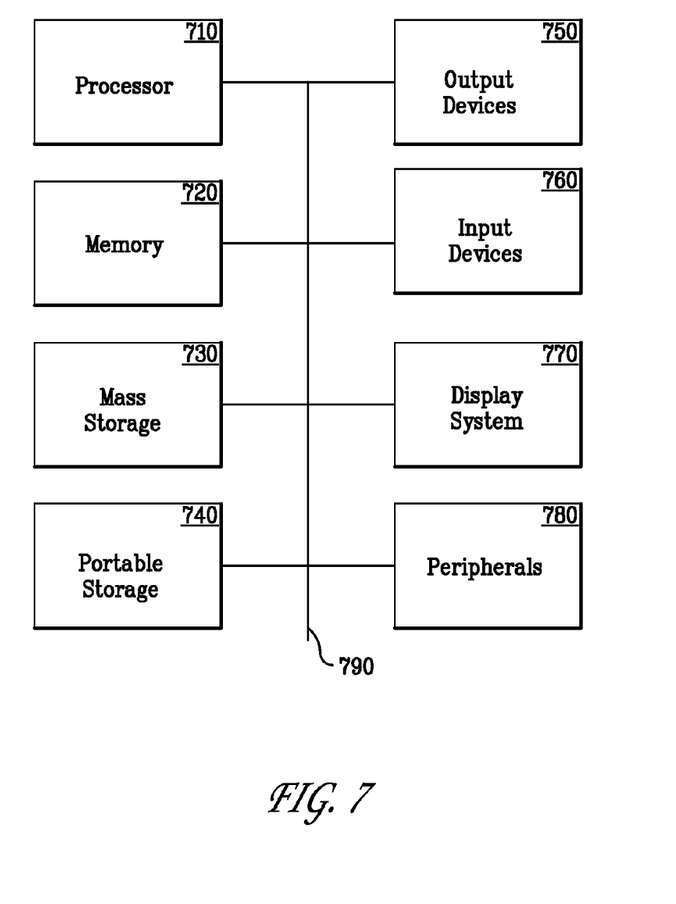
FIG. 7 illustrates a computing system that may be used to implement an embodiment of the present invention.

FIG. 7 illustrates a computing system 700 that may be used to implement an embodiment of the present invention. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. The components may be connected through one or more data transport means. For example, processor 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive, Solid State Drive, or an optical disk drive, is a non-volatile storage device for storing data and instructions for use by processor 710. Mass storage device 730 can store the system software for implementing embodiments of the present invention for purposes of loading that software into main memory 720.

Portable storage device 740 operates in conjunction with a portable non-volatile storage medium, such as a floppy disk, Solid State Drive, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Various touch-driven versions of these input devices may also be used for providing input of information. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device. Peripherals 780 may include any type of computer support device to add additional functionality to the computer system. For example, peripheral device(s) 780 may include a modem or a router. Other peripherals may include the ability to display generated information on a remote device, connected either by a physical connection or via any number of wireless devices and/or networks.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, iOS, Android, and other operating systems as known to one of skill in the art.

Votes or data proffered through the course of the method 200 of FIG. 2 or nominations provided through the course of the method 500 of FIG. 5 may be ranked and displayed in accordance with that ranking. Top vote getters may be displayed at the top of the displayed list and the least popular answers ranked near the bottom. A low ranking is not necessarily indicative of a bad idea, but of (perhaps) a newly submitted answer or idea that has not yet received feedback from a variety of users. In one embodiment, any new nomination or suggestion might appear at the top of the list for a pre-determined amount of time, to allow it to receive consideration from the voting audience. After that pre-determined amount of time, the actual ranking of the nomination or suggestion—based on votes—will come into play and determine the subsequent position of the nomination or suggestion in the ranking.

Votes or responses may be updated or provided in real-time and up until a contribution period closes. As such, a first user may vote on one submission at one point in the day (e.g., 10 AM). The vote of the first user may correspond to the best available idea at that time (i.e., at 10 AM). If a subsequent contributor (i.e., a second user) submits a better idea or response later in the day (e.g., 1 PM), the first user may come back later in the day (e.g., 2 PM) and change their vote or ranking from their initial offering. In this regard, a user is not "locked in" to a previous vote in those instances where a better idea is suggested later in a contribution period or events unfold that might make an initial choice to later be undesirable (e.g., a vote for a politician later implicated in a tawdry scandal. In the example of nominations being for "ideas," a better idea may appear that warrants a change of vote.

Still further embodiments of the present invention may allow for multiple nominations. For example, the nominations could solicit the "top 3 candidates" or a user's "top five all time songs." In a multiple Vote or Nominate implementation, the process would allow but not be limited to either (a) a simple version, with a single nomination screen (template) that allows for all of the multiple nominees (maybe with less total data), or (b) a more complex version, which opens multiple "nomination" data templates. In the Vote or Suggest version, the entry could simply be limited to one "suggestion" field for each "suggestion."

Notwithstanding the opportunity for multiple nominations, results may still be tabulated independently and result in post-vote ranking based on the total number of votes for each individual nomination or suggestion (even though they were grouped in the nomination or suggestion process). For example, if each person nominated or suggested 3 ideas, people, or some other idea, individual cumulative results would still rank according to total votes cast for each one, so that an extremely popular entry might rank highly, but other entries would fall into the ranking subject to cumulative votes, even though all three were submitted together. Calculation of votes and ranking may take into account those situations where a user is offered multiple votes, which may be applied against one or more ideas.

Embodiments of the present invention may also take in account geo-location information. For example, information concerning the location of a voter making a nomination may be taken into account. This information may be integrated with a mapping or other geographic information service (GIS) to properly show the physical location of nominations and voters such that local issues and interests may be properly derived. Embodiments might also identify other information about the voter, including membership in a group (e.g., a political party affiliation), or demographic or psychographic information.

The present invention may also be integrated into social media applications such as LinkedIn, Facebook, or Twitter to augment the voting process. Widgets may be integrated with such services to allow for accumulation of votes or nominations from third-party applications. Profile information may also be integrated into a voting process as may be appropriate.

What is claimed is:

1. A method for processing user input, the method comprising:
    publishing an open-ended query to a user audience;
    receiving first responses to the open-ended query from a plurality of users in the user audience, wherein each of the plurality of users is an individually identifiable user;
    displaying open-ended query response data, the open-ended query response data including the received first responses, wherein the open-ended query response data is displayed in real-time;
    receiving updated responses from one or more of the plurality of users that previously provided a first response to the open-ended query, the updated responses being responsive to the same published open-ended query, wherein each of the updated responses replaces the first response previously provided by the respective individually identifiable user of the plurality of users, and wherein at least one of the updated responses is a vote for one of the received first responses;
    assigning rankings to the received responses in real-time according to popularity, the rankings updated dynamically, wherein the popularity of each of the received responses is based on a number of votes received for the respective received response, and wherein the received responses include the first responses received from the plurality of users that have not provided updated responses and the received updated responses; and
    displaying updated open-ended query response data, the updated open-ended query response data including the received responses and the rankings, wherein the updated open-ended query response data is displayed in real-time.

2. The method of claim 1, wherein the first responses and the updated responses are provided in accordance with a template corresponding to the open-ended query.

3. The method of claim 1, wherein the open-ended query is a voting process.

4. The method of claim 1, wherein the open-ended query is a nomination process.

5. The method of claim 1, further comprising sending an alert to the user audience about the published open-ended query.

6. The method of claim 5, wherein the alert is a text message.

7. The method of claim 5, wherein the alert is an e-mail message.

8. The method of claim 5, wherein the alert is video-based.

9. The method of claim 5, wherein the alert is a combination of two or more message notifications.

10. The method of claim 1, further comprising tracking the first responses and the updated responses to maintain a history of the first responses and the updated responses.

11. The method of claim 1, wherein the updated responses are feedback about the first responses to the published open-ended query.

12. The method of claim 1, wherein the updated open-ended query response data is displayed after a contribution time period has closed, and wherein the updated open-ended query response data includes a ranked order of received responses at the time of contribution time period closing.

13. The method of claim 1, further comprising generating metric information about the open-ended query response data.

14. The method of claim 13, wherein the metric information includes identities of the plurality of users who responded to the open-ended query.

15. A non-transitory computer-readable storage medium having embodied there on a program, the program being executable by a processor to perform a method for processing user input, the method comprising:
publishing an open-ended query to a user audience;
receiving first responses to the open-ended query from a plurality of users in the user audience, wherein each of the plurality of users is an individually identifiable user;
displaying open-ended query response data, the query response data including the received first responses, wherein the open-ended query response data is displayed in real-time;
receiving updated responses from one or more of the plurality of users that previously provided a first response to the open-ended query, the updated responses being responsive to the same published open-ended query, wherein each of the updated responses replaces the first response previously provided by the respective individually identifiable user of the plurality of users, and wherein each of the updated responses is a vote for one of the received first responses;
assigning rankings to the received responses in real-time according to popularity, the rankings updated dynamically, wherein the popularity of each of the received responses is based on a number of votes received for the respective received response, and wherein the received responses include the first responses received from the plurality of users that have not provided updated responses and the received updated responses; and
displaying updated open-ended query response data, the updated open-ended query response data including the received responses and the rankings, wherein the updated open-ended query response data is displayed in real-time.

* * * * *